(12) United States Patent
Notermann

(10) Patent No.: US 6,735,917 B1
(45) Date of Patent: May 18, 2004

(54) CONNECTED FRAME STRUCTURE AND METHOD OF CONNECTING FRAME MEMBERS

(76) Inventor: Dalles C. Notermann, P.O. Box 54, Victoria, MN (US) 55386

( * ) Notice: Subject to any disclaimer, the term of this patent is extended or adjusted under 35 U.S.C. 154(b) by 0 days.

(21) Appl. No.: 10/034,283

(22) Filed: Dec. 28, 2001

Related U.S. Application Data

(60) Provisional application No. 60/258,623, filed on Dec. 29, 2000.

(51) Int. Cl.[7] .................................. E09C 5/04
(52) U.S. Cl. .................. 52/656.9; 52/653.1; 52/668
(58) Field of Search ..................... 52/653.1, 656.9, 52/668; 403/331, 381

(56) References Cited

U.S. PATENT DOCUMENTS

| | | | | |
|---|---|---|---|---|
| 733,500 A | * | 7/1903 | Moore | 403/376 |
| 792,979 A | * | 6/1905 | Fulghum | 403/331 |
| 1,662,768 A | * | 3/1928 | Wait | 403/263 |
| 2,058,117 A | * | 10/1936 | Wendel et al. | 296/183 |
| 3,132,443 A | * | 5/1964 | Kuhn | 446/112 |
| 3,632,146 A | * | 1/1972 | Buzby et al. | 52/285.2 |
| 4,019,298 A | * | 4/1977 | Johnson, IV | 52/590.1 |
| 4,068,440 A | | 1/1978 | Lillethorup | |
| 4,136,988 A | | 1/1979 | Nist | |
| 4,398,841 A | * | 8/1983 | Kojima et al. | 403/173 |
| 4,542,933 A | | 9/1985 | Bischoff | |
| 4,645,374 A | | 2/1987 | Erickson et al. | |
| 4,787,670 A | | 11/1988 | Bentz | |
| 5,003,748 A | | 4/1991 | Carr | |
| 5,218,792 A | | 6/1993 | Cooper | |
| 5,349,800 A | | 9/1994 | Peng | |
| 5,359,828 A | * | 11/1994 | Day | 52/665 |
| 5,398,468 A | | 3/1995 | Erickson | |
| 5,553,906 A | | 9/1996 | Kunz | |
| 5,634,663 A | | 6/1997 | Krupp et al. | |
| 5,964,071 A | * | 10/1999 | Sato | 52/656.1 |

* cited by examiner

Primary Examiner—Carl D. Friedman
Assistant Examiner—Basil Katcheves

(57) ABSTRACT

An interlocking joint structure has a first tubular frame member having a key-shaped slot to slidably accommodate a second elongated T-shaped frame member. An adhesive is used to bond the first and second frame members together. A plurality of tubular members and T-shaped members are used to form lattices and trusses in building construction. A band of semi-rigid, textured can be weaved through the slots in adjacent tubular frame members to cross brace the construction.

13 Claims, 15 Drawing Sheets

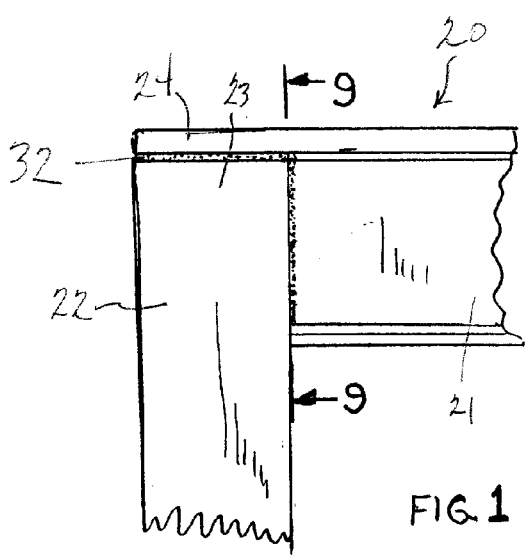
FIG. 1
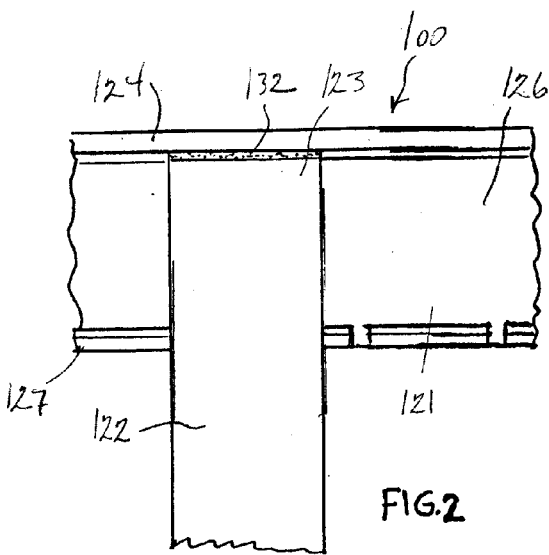
FIG. 2
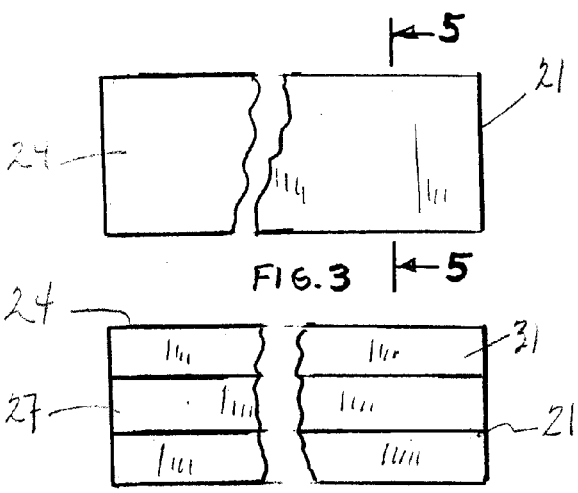
FIG. 3
FIG. 4
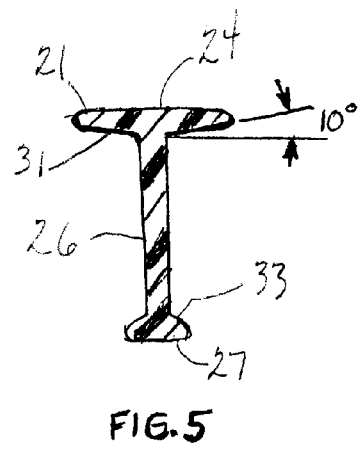
FIG. 5
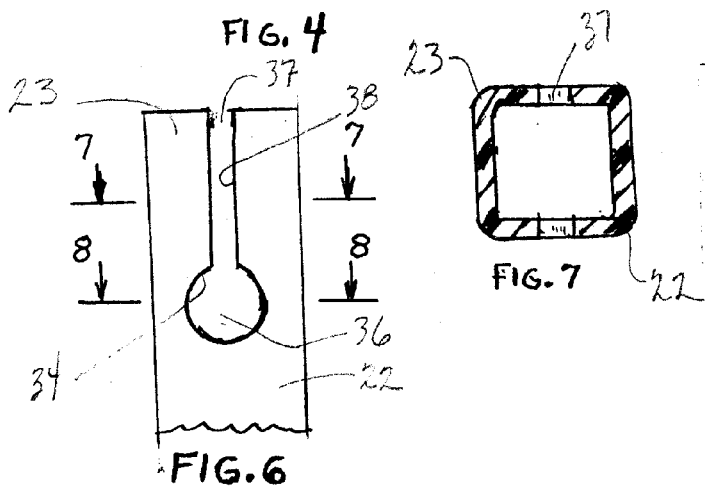
FIG. 6
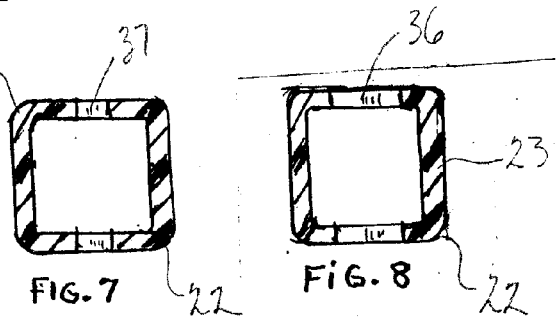
FIG. 7
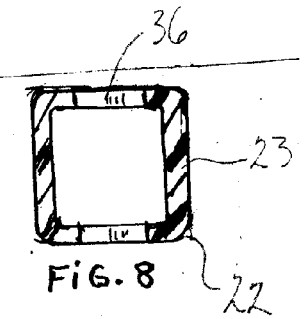
FIG. 8

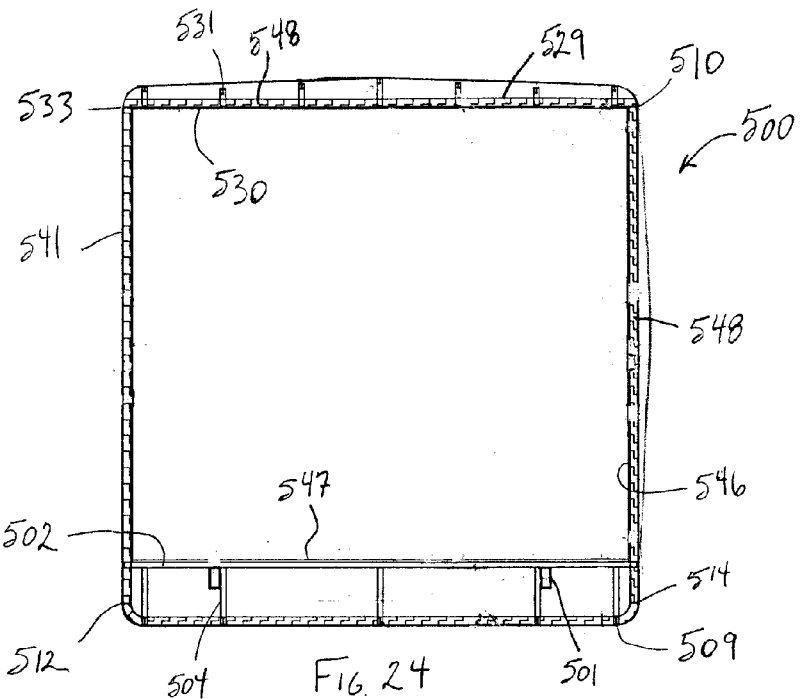
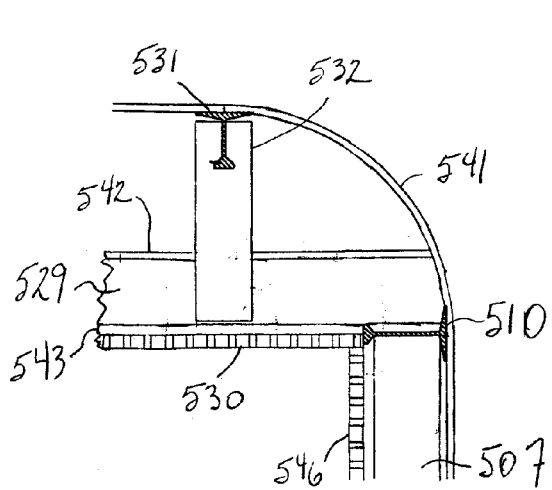
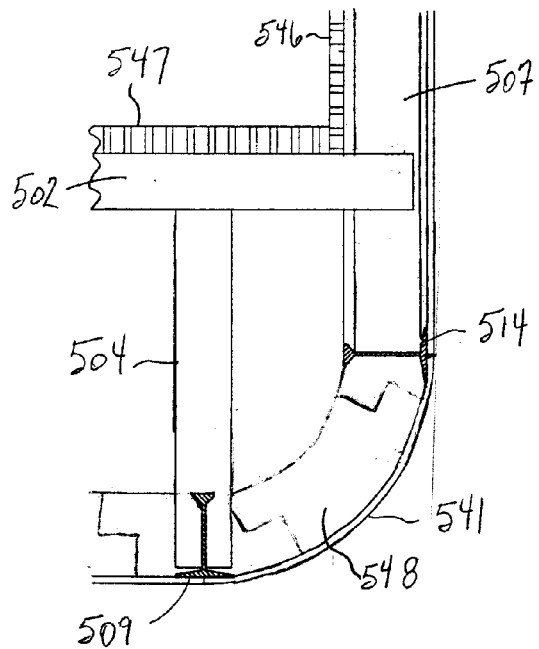

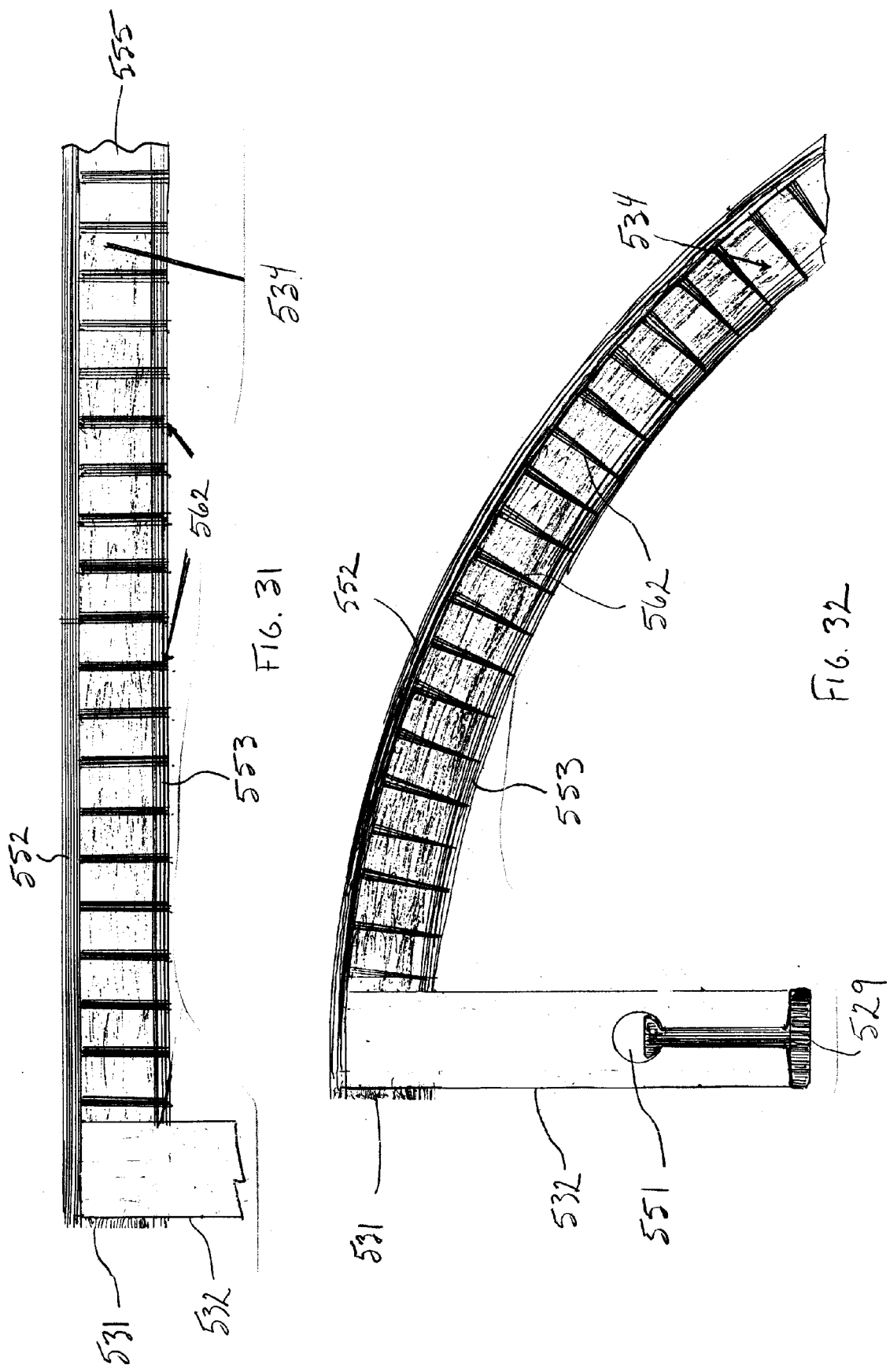

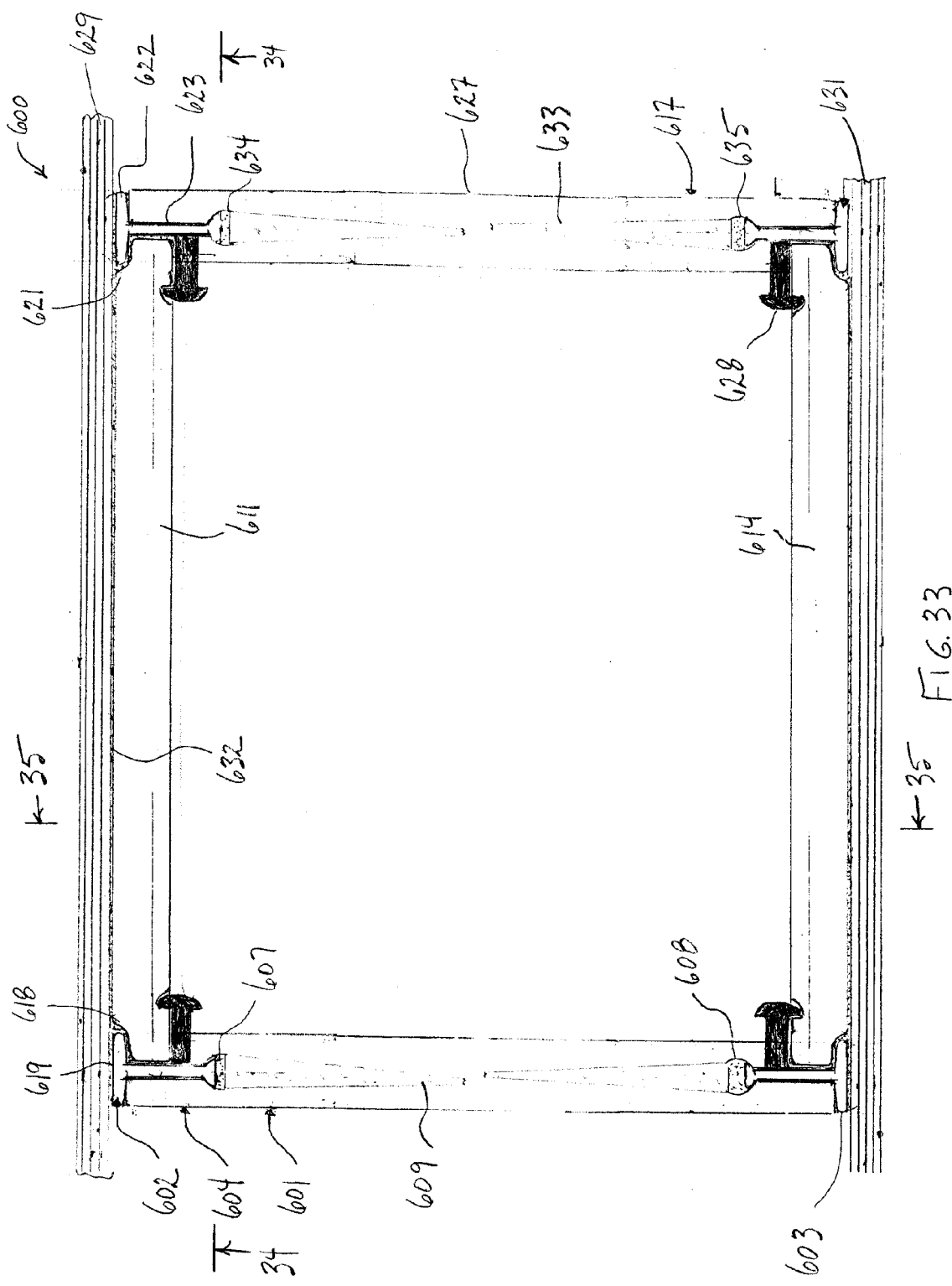

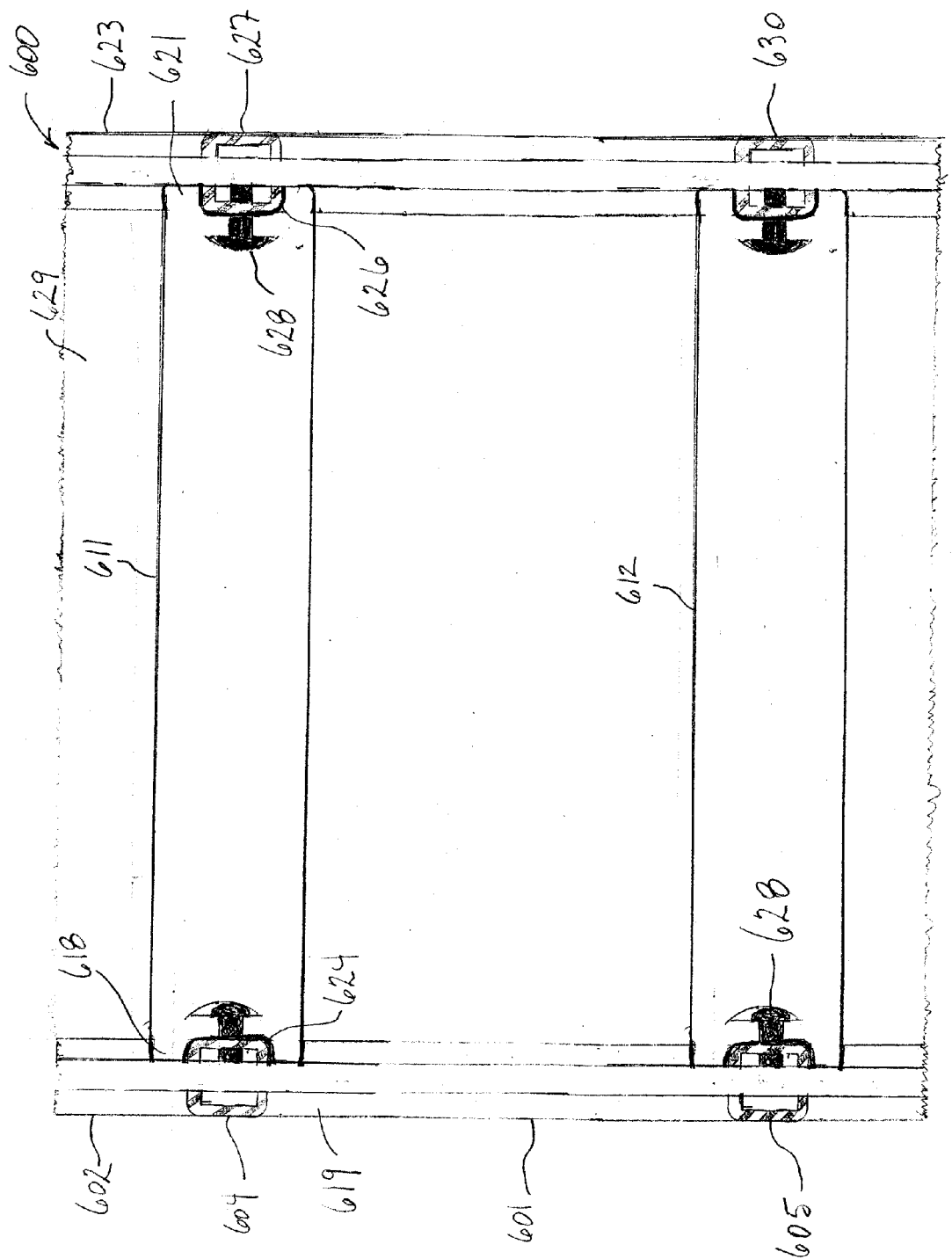

CONNECTED FRAME STRUCTURE AND METHOD OF CONNECTING FRAME MEMBERS

This application claims the benefit of Provisional application No. 60/258,623 filed Dec. 29, 2000.

FIELD OF THE INVENTION

The invention is in the art of frame structures and methods of connecting frame members in structures, such as building structures used in recreational activities and residential building structures.

BACKGROUND OF THE INVENTION

Motor home recreational vehicles, pickup campers, modular homes and frame houses are constructed with metal and wood framework and substructure. Wood is relatively weak, is a fire accelerant, and may rot when exposed to the elements. Metal frames are expensive, heavy and susceptible to rust and corrosion. The joint designs of these structures commonly employ connecting bolts and screws which are burdened with the weight of the walls, floor and ceiling of the structure. Construction of these frameworks is difficult and labor intensive.

SUMMARY OF THE INVENTION

The frame structure and method of connecting frame members of the invention are used in the construction of floors, walls and ceilings of various building structures. Examples of structures include recreational vehicles such as mini homes, motor homes, travel and tent trailers, pickup campers and toppers, fifth wheels and the like, houseboats, mobile homes and ice fishing houses. The frame members of the frame structure are lightweight, moisture, fire resistant, rust resistant, dent proof, and nonconductive, and are relatively inexpensive to manufacture and easily cut and machined. The frame members are connected without the use of bolts and screws to form a sufficiently strong framework which is compatible to building materials, insulation and coverings. The framework has a high shape retention and low expansion character which significantly increases the accuracy of the design structure and shape.

The frame structure has a first frame member having slotted ends which accommodate the upright leg of a second frame member. The first frame member is a slotted square linear tubing member. The second frame member is a modified linear I-beam or T-bar member. The inner end of the second frame member has a transverse flange having a width which is wider than the slot width in the end of the first frame member. The transverse inner flange is located in an enlarged inner end portion of the slot in the first frame member and engages an interior portion of the first frame member. The outer end of the second frame member has a second transverse outer flange having a width substantially the same as the width of the end of the first frame member. The inner surface of the outer flange engages the end of the first frame member. The outer surface of the leg has a sliding fit with the sides of the slot. An adhesive located between the inner flange and the interior portion of the first frame member, the outer flange and the end of the first frame member, and the leg and the sides of the slot bonds the first and second frame members together. Preferably, the first and second frame members are pultruded resin impregnated fiberglass members having a wall thickness of approximately 0.125 inches. A polyurethane adhesive can be used to fasten the frame members together. Other adhesives compatible with the material of the first and second frame members can be used to secure the frame members together.

DESCRIPTION OF THE DRAWINGS

FIG. 1 is a side elevational view of a frame structure of the invention;

FIG. 2 is a side sectional view of a modification of the frame structure of FIG. 1;

FIG. 3 is a foreshortened top plan view of the first member of the frame structure of FIG. 1;

FIG. 4 is a foreshortened bottom plan view of FIG. 3;

FIG. 5 is a sectional view taken along line 5—5 of FIG. 3;

FIG. 6 is a side elevational view of the second member of the frame structure of FIG. 1;

FIG. 7 is a sectional view taken along line 7—7 of FIG. 6;

FIG. 8 is a sectional view taken along line 8—8 of FIG. 6;

FIG. 24 is a sectional view taken along line 24—24 of FIG. 20;

FIG. 25 is an enlarged side elevational view of the head portion of FIG. 24;

FIG. 26 is an enlarged side elevational view of the sill portion of FIG. 24;

FIG. 31 is an enlarged side elevational view of the roof rafter of the frame structure of FIG. 20 in an extended position;

FIG. 32 is an enlarged side elevational view similar to FIG. 31 showing the roof rafter of the frame structure of FIG. 20 in a curved position;

FIG. 33 is a foreshortened side elevational view of the truss framing of a sixth modification of the frame structure of FIG. 1;

FIG. 34 is a sectional view taken along line 34—34 of FIG. 33; and

DESCRIPTION OF THE INVENTION

Figure 9:
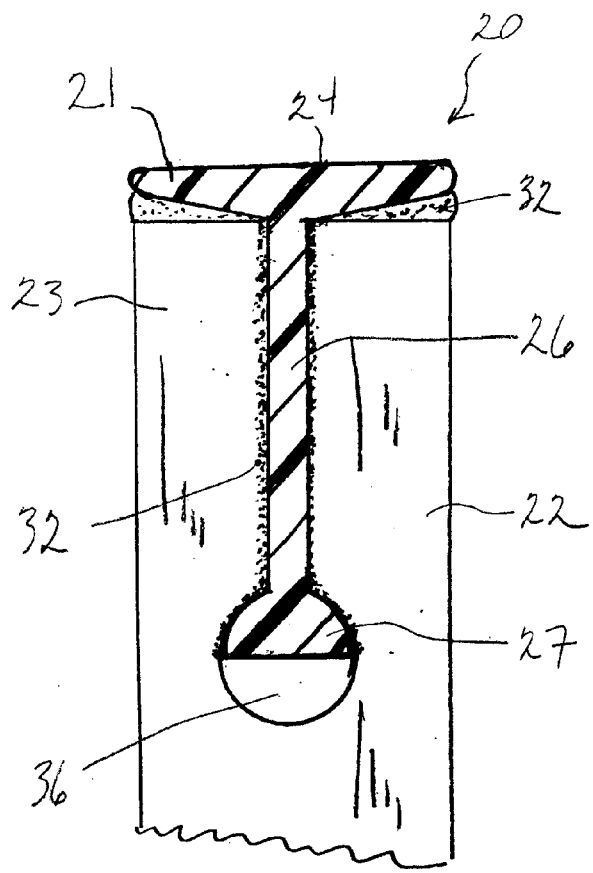
FIG. 9 is an enlarged sectional view taken along line 9—9 of FIG. 1.

Referring to FIG. 1, there is shown a frame structure 20 of the invention for a building structure such as travel trailers, motorized recreational vehicles and mobile home framing systems. Frame structure 20 has a first frame member 21 joined to a second frame member 22 at about a 90 degree angle. Second frame member has a slotted end 23 to accommodate one end of the first member 21. Members 21 and 22 are made of high strength, lightweight, nonconductive, moisture-resistant and fire-resistant material, such as pultruded resign impregnated fiberglass having a wall thickness of approximately 0.125 inches. An adhesive 32, such as poly urethane adhesive, is used to secure first member 21 to second member 22. Other adhesives can be used to bond frame members 21 and 22. Frame structure 20 does not use an hardware, such as nut, bolts and screws to join members 21 and 22. Frame structure is compatible with other building materials, such as floor and wall coverings, and insulation used in the construction of building structures.

Referring to FIGS. 3 to 5, first frame member 21 is a modified T-shaped linear bar or beam having a top flange 24 joined to one end of a generally flat transverse web 26. The opposite end of web 26 is connected to a bottom flange 27. Flange 27 has a width that is less than the width of top flange 24. The outer surfaces of flanges 24 and 27 are generally flat. As shown in FIG. 5, the inner surfaces 31 of flange 24 slope upwardly from web 26 at about a 10 degree angle. Adhesive 32 is used to secure the inner surfaces 31 of flange 24 to end 23 of second frame member 22. The inner surfaces 31 slope upwardly from end 23 whereby adhesive 32 can be applied between end 23 and flange 24, as seen in FIG. 9. The inner surfaces 33 of bottom flange 27 curve downwardly from web 26 to the outer surface of flange 27. The radius of curved surfaces 33 is complementary to curved surfaces 34 of opening 36 in second frame member 22. Web 26 has a width and length approximately the same as the width and length of slot 37 in second frame member 22 whereby web 26 has a sliding fit relation with slot walls 38. The sliding fit relation between web 26 and slot walls 38 limits lateral movement between the first and second frame members 21 and 22. The inner surfaces of flange 27 are located immediately adjacent to the curved surface 34 of opening 36. Inner surfaces 31 of flange 24 are located adjacent end 23. Flanges 24 and 27 cooperate with end 23 and curved surface 24 to lock frame members 21 and 22 together. The widths of flanges 24 and 27 are greater than the width of slot 37 whereby members 21 and 22 cannot be pulled apart longitudinally. Adhesive 32 is used to secure the inner surfaces 33 of flange 27 to curved surface 34 and web 26 to slot walls 38, as shown in FIG. 9.

Referring to FIGS. 6 to 8, second member 22 is a square linear tubing, such as a square 2"×2" pultruded resin impregnated fiberglass tubing. Tubing 22 can be used as a floor joist, inside framing and spacers between ceiling rafters in trailers, recreational vehicles and mobile home frame systems. Tubings having other dimensions can be used in frame structure 20. For example, tubing can be 1"×1" square tubing or 2"×3" rectangular shaped tubing. End 23 of tubing 22 has a longitudinal key-shaped slot 37 open to the outer end 23. One end of frame member 21 is slid into slot 37 to connect frame members 21 and 22. Slot 37 has transversely spaced generally linear walls 38. The inner end of slot 37 has a circular opening 36 extending transversely through end 23. The diameter of opening 36 is larger than the width of the outer end of slot 37. The length of the outer end of slot 37 is substantially the same as the length of web 26. Frame 21 has a sliding fit relation with slot 37. Bottom flange 27 located in opening 36 has a width greater than the width of slot 37 to prevent outward longitudinal movement of frame member 21.

The opposite end of tubing 22 has a key shaped slot substantially the same as slot 37. The key slot on the opposite end of tubing 22 is perpendicular to slot 37. Tubing having ends with aligned key slots can also be used in frame structure 20.

Figure 10:
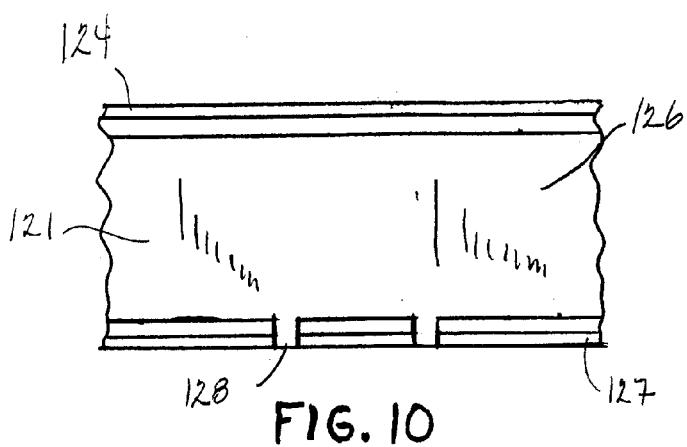
FIG. 10 is a side elevational view of the first member of the frame structure of FIG. 2.
Figure 11:
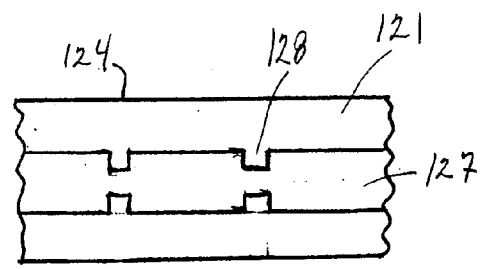
FIG. 11 is a bottom plan view of FIG. 10.

Referring to FIGS. 2, 10 and 11, there is shown a modification of the frame structure indicated generally at 100. Frame structure 100 has a first frame member 121 having an intermediate portion joined to an end 123 of second frame member 122 at a right angle. Frame members 121 and 122 are pultruded resin impregnated fiberglass members. Frame member 121 and 122 are durable, lightweight, moisture resistant, fire resistant and nonconductive linear members. Frame members 121 and 122 have the ability to retain shape and accuracy of frame structure 100. An adhesive 132, such as polyurethane adhesive, is used to bond frame members 121 and 122 together. It is not necessary to use hardware, such as nuts, bolts and screws to connect frame members 121 and 122 of frame structure 100. Frame structure 100 is useable to construct building structures, such as travel trailers, motorized recreational vehicles and pick-up truck campers and toppers. Frame structure 100 is compatible with other building materials, namely floor and wall coverings, and insulation used in the construction of building structures.

Referring to FIGS. 10 and 11, first frame member 121 is a modified T-shaped linear bar or beam having a top flange 124 with a generally flat outer surface and a bottom flange 127 joined to a generally flat transverse web 126. Second frame member 122 is a linear tubing having a key shaped slotted end 123 to accommodate an intermediate portion of first frame member 121. First frame member 121 has a sliding fit relation with the end 123 of second frame member 122 substantially the same as the sliding fit relation of frame members 21 and 22, shown in FIG. 9. Bottom flange 127 has a pair of grooves or notches 128 located at an intermediate portion of flange 127 to allow an inner portion of frame member 121 to be inserted into the key slot in end 123. After member 121 is inserted into end 123, member 121 can be moved laterally to move notches 128 out of alignment with the key slot in end 123 and thereby lock members 121 and 122 together in a manner substantially the same as the locking of members 21 and 22, as seen in FIG. 9. Adhesive 132 is used to bond frame members 121 and 122 together. Frame structure 100 is used in interior areas of framing systems, cabinet framing and storage framing where it is not practical or possible to slide the end of first member 121 into the slotted end 123 of second frame member 122.

Figure 12:
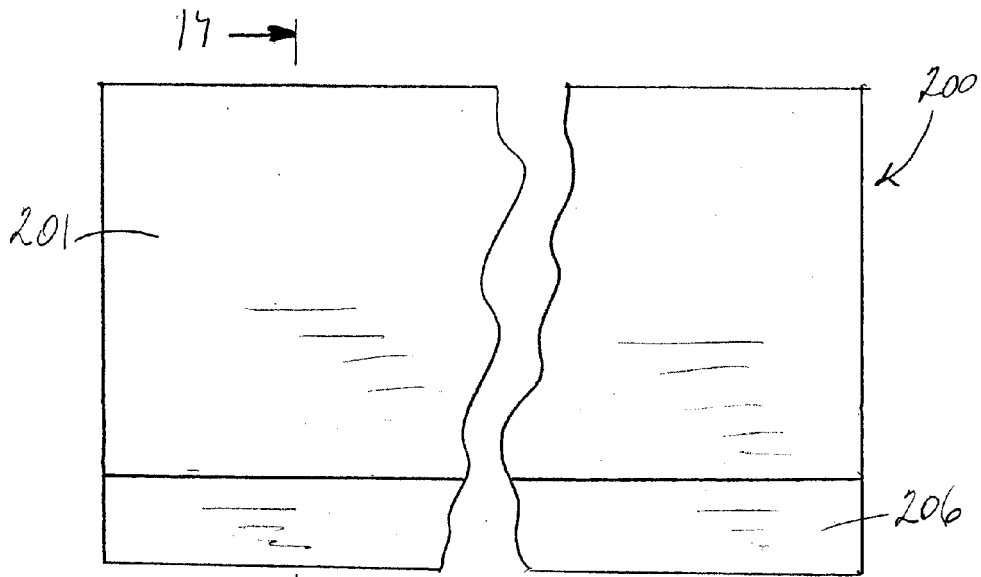
FIG. 12 is a foreshortened top plan view of a second modification of the frame structure of FIG. 1.
Figure 13:
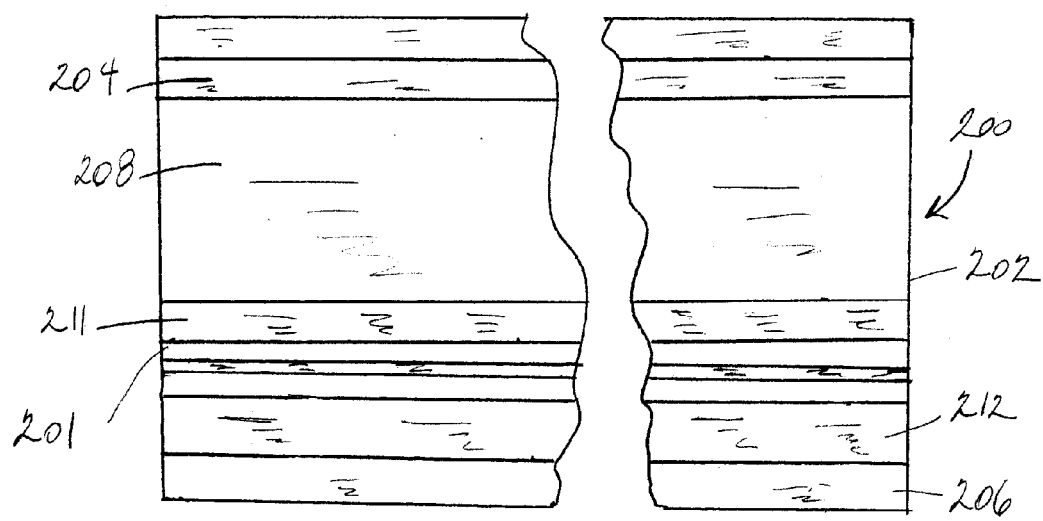
FIG. 13 is a foreshortened side elevational view of the frame structure of FIG. 12.
Figure 14:
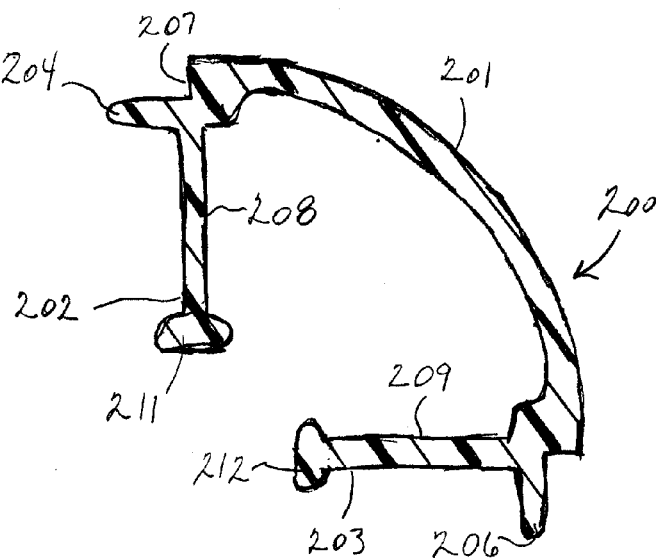
FIG. 14 is a sectional view taken along line 14—14 of FIG. 12.

Referring to FIGS. 12 to 14, there is shown a second modification of the frame structure indicated generally at 200. Frame structure 200 is a corner joint for a building structure, such as a head or sill corner joining the walls, ceiling and floor of a recreational travel trailer. Frame structure 200 is a pultruded resin impregnated fiberglass member, which is durable, lightweight and non-conductive. Frame structure 200 is compatible with coverings for walls, ceilings and floors of recreational travel trailers.

Frame member 200 is a linear beam having an arcuate middle section or back wall 201 joined to inwardly directed T-shaped legs 202 and 203. Each leg 202 and 203 has a laterally extending outer flange 204 and 206 having a top surface recessed from the top surface of middle section 201 to define a groove 207 to accommodate exterior skin material of a building structure. Generally flat transverse webs 208 and 209 extend inwardly from flanges 204 and 206 to an inner flange 211 and 212. The inner surfaces of flanges 211 and 212 are generally flat providing a flat support surface for ceiling, wall and floor coverings. Back wall 201 has a ninety degree curved radius whereby legs 202 and 203 extend in planes perpendicular to each other. Legs 202 and 203 are adapted to be inserted into key shaped slotted ends of square tubing, such as frame member 22 to join walls, ceiling and floor framing.

Figure 15:
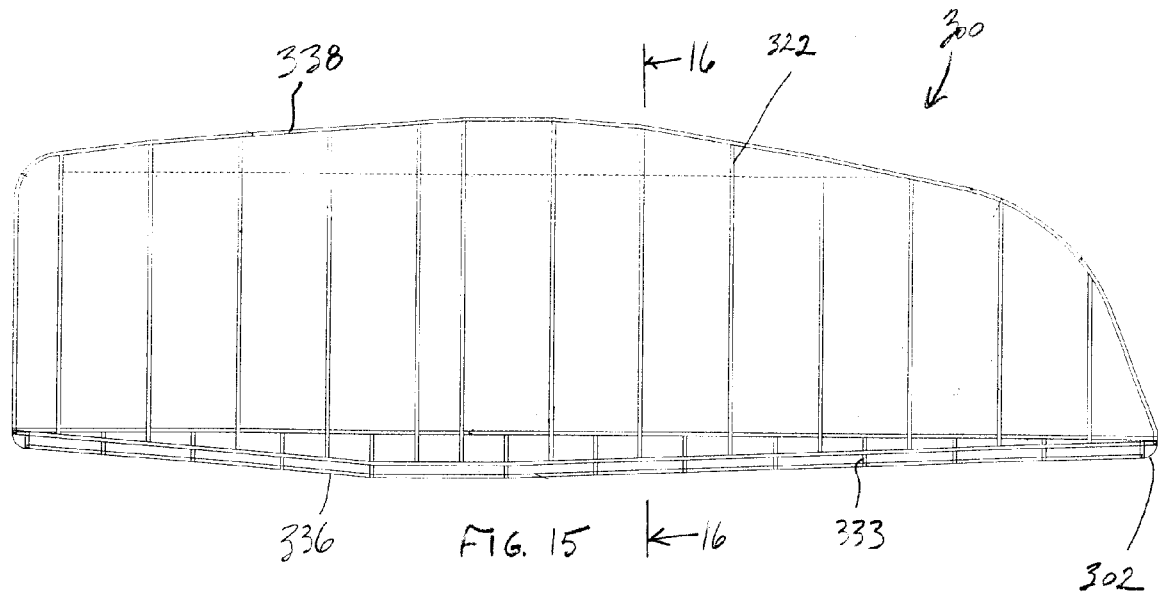
FIG. 15 is a side elevational view of a third modification of the frame structure of FIG. 1.

Referring to FIGS. 15 to 18, there is shown a third modification of the frame structure indicated generally at 300. Frame structure 300 is a frame system for a recreational travel trailer. Framing system 300 has a plurality of laterally spaced floor joists or tubing 321. Tubing 321 is rectangular or square pultruded resin impregnated fiberglass tubing which extends from side to side of frame system 300. The ends of tubing 321 have slots to accommodate T-shaped side wall studs 322. A floor covering 325, such as plywood is fastened to tubing 321 to complete the floor deck. Studs 322 are modified T-shaped pultruded resign impregnated fiberglass beams having a relatively wide first flange 323 joined to a second short flange 324. Flange 323 has an outwardly directed flat surface to support the outer skin 332. Flange 324 has an inwardly directed flat surface to support wall covering 320. A curved continuous wall plate 338 extends up the front, across the top and down the back of framing system 300, as seen in FIG. 15. A plurality of under chassis frame members 336 extend from the front to the back of frame system 300 below floor tubing 321. Sill drops 333 connected to floor tubing 321 and chassis frame members 336 vary in length with longer drops in the middle of the under chassis of frame system 300 to bow the under chassis. Wall studs 322 are joined to wall plate 338 and chassis frame members 336.

Figure 17:
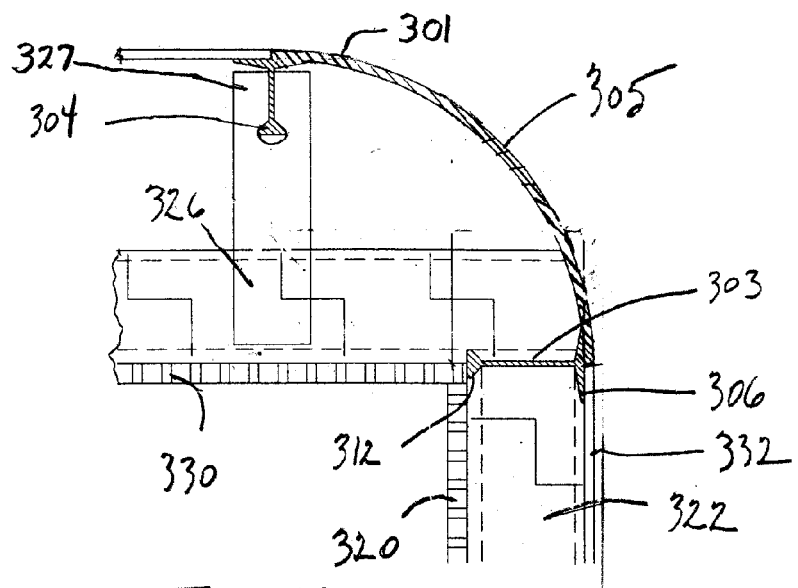
FIG. 17 is an enlarged side elevational view of the head portion of FIG. 16.
Figure 18:
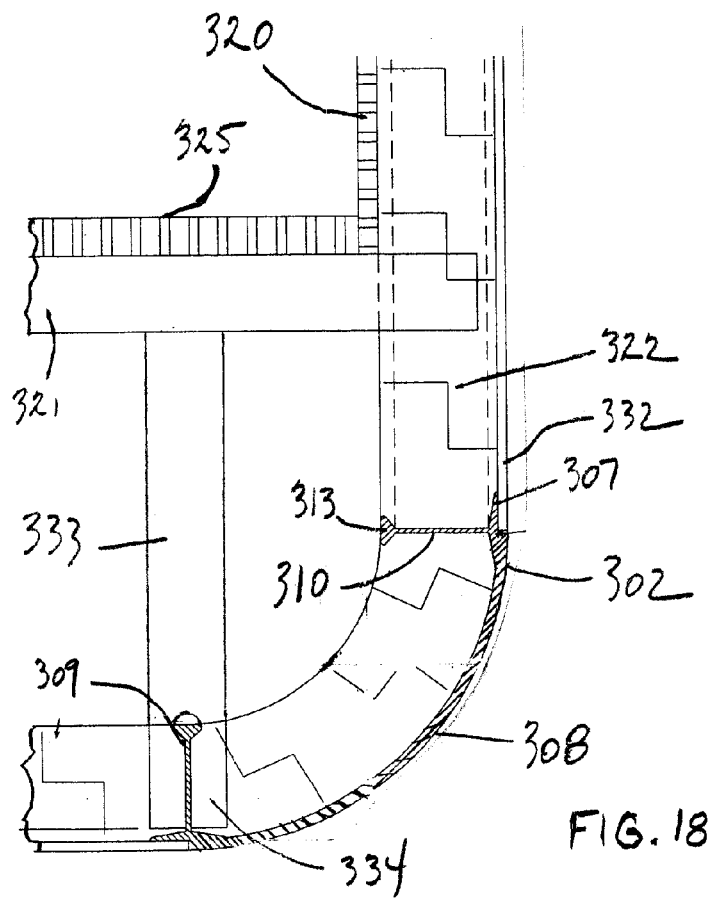
FIG. 18 is an enlarged side elevational view of the sill portion of FIG. 16.

Referring to FIGS. 17 and 18, the top ends of wall studs 322 are notched to accept flanges 306 and 312 of the leg 303 of frame member 301. Corner frame member 301 has a ninety-degree radius curved back wall 305 extending to an upright leg 304. The lower end of upright leg 304 is located in key shaped slot in the end 327 of ceiling riser tubing 326. The bottom ends of wall studs 322 are notched to accept flanges 307 and 313 of leg 304 of lower corner frame member 302. A ninety-degree radius curved back wall 308 extends from leg 310 to an upright leg 309 of corner frame member 302. Leg 309 is located in a key shaped slot in the end 334 of sill drop tubing 333. Flanges 306 and 307 are inwardly recessed from the outer surface of back walls 305 and 308 whereby the ends of outer skin 322 abut the ends of walls 305 and 308.

Figure 16:
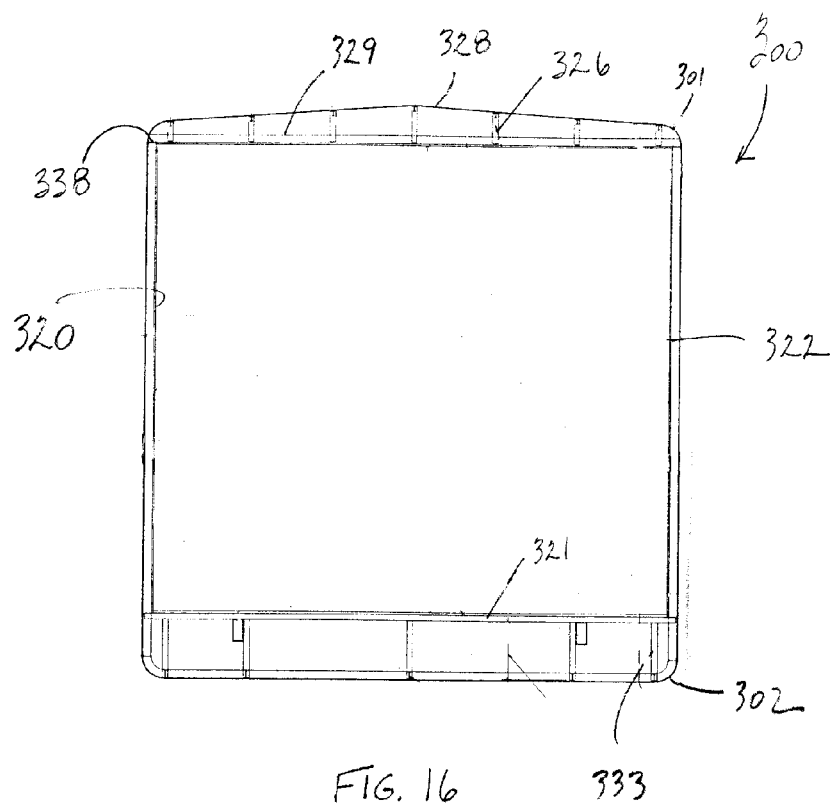
FIG. 16 is a sectional view taken along line 16—16 of FIG. 15.

Ceiling risers 326 vary in length with longer risers in the middle of frame structure 300 and shorter risers at the sides of the frame structure to slope roof 328, as seen in FIG. 16. Transverse ceiling rafters 329 extend from one side of framing system 300 to the opposite side thereof. Rafters 329 are transversely spaced modified T-shaped pultruded resin impregnated fiberglass beams having an upper end that extends upwardly into the key slots of the lower ends of ceiling risers 326. A flange on the upper end of ceiling rafters 329 has a width that is greater than the width of the key slot in ceiling riser 326 to lock ceiling rafters 329 to ceiling riser 326. A second wider flange on the lower end of ceiling rafters 329 has a relatively flat inner surface to support ceiling panels 330. The opposite or upper end of ceiling risers 326 has a key slot which is perpendicular to the slot on the lower end of ceiling riser 326 to accommodate roof rafters 331. Roof rafters 331 extend from the front of framing system 300 to the back thereof above ceiling rafters 329 forming a lattice thereby strengthening the roof framing of system 300.

A polyurethane adhesive is used to secure ceiling rafters 329 and roof rafters 331 to ceiling risers 326 and to secure floor tubing 321 and under chassis frame members 336 to sill drops 333. It is not necessary to use nuts, bolts and screws to assemble frame system 300.

In building a side wall for frame system 300 T-studs 322 are laid out at a predetermined transversely spaced distance with wide first flange 323 facing down. Corner frame member 301 is bonded to the notched top ends of studs 322 with an adhesive. Wall covering 320, such as vinyl covered plywood is attached to the inner flat surface of flange 324. The wall is lifted to a vertical position and the bottom of studs 322 are inserted into the slotted ends of floor tubing 321. The bottoms of studs 322 are then bonded to the ends of tubing 321. Corner frame member 302 is secured to the notched bottom ends of studs 322. Upright leg 309 is inserted in the first sill drop 333 of the under chassis structure.

In the roof construction, ceiling rafters 329 are laid out at a predetermined transversely spaced distance with the wide flange facing down. Ceiling risers 326 are slotted at each end to accept the ceiling rafters 329 and roof rafters 331 in a perpendicular manner to form a latticed framework. Adhesive is used to bond rafters 329 and 331 and risers 326. After ceiling panels are glued to the inner surface of ceiling rafters 329, the roof framework is lifted to the top of the preassembled side wall and vertical leg 304 of corner frame member 301 is inserted into the first ceiling riser 326 and bonded to connect the roof and side wall. Rigid insulation, such as STYROFOAM expanded rigid polystyrene plastic adapted to fit between the flanges of T-studs 322 and ceiling rafters 329 insulates frame system 300.

Figure 19:
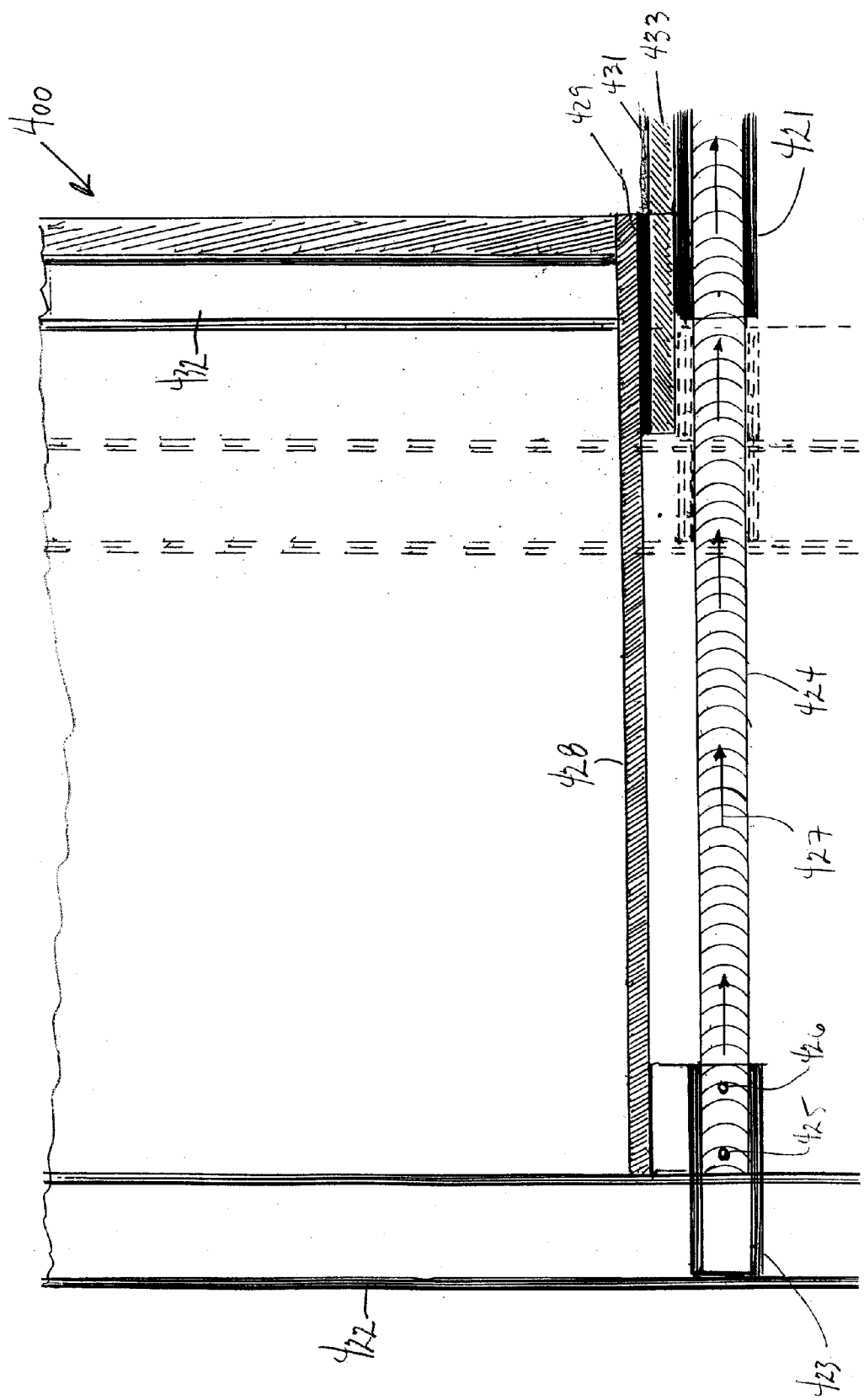
FIG. 19 is a side elevational view of a fourth modification of the frame structure of FIG. 1.

Referring to FIG. 19, there is shown a fourth modification of the frame structure indicated generally at 400. Frame structure 400 is a slide out room for a recreational travel trailer, such as trailer 300. Slide out 400 has a plurality of laterally spaced floor joists or tubing 421. The ends of tubing 421 have key shaped slots which accommodate T-shaped side wall studs 422. A high-strength generally circular rod 424 is secured to end 423 with pins 425 and 426. Rod 424 telescopes into tubing 421. The inner walls of tubing 421 are curved or rounded to accommodate rod 424. Tubing 421 is reamed to size the interior surface of tubing 421 to slideably fit the outer surface of rod 424. End 423 separates from tubing 421 when slide out 400 is moved to the out position, as shown in FIG. 19. When slide out 400 is moved to the in position, as shown by arrows 427 in FIG. 19, rod 424 slides into tubing 421. Floor covering 428 of slide out 400 is slideably supported on a bearing surface 429, such as a polyethylene wear bar, to allow floor covering 428 to clear floor covering 425 and carpet 431 of the trailer. A lubricant is applied to the outer surface of rod 424 to reduce friction between rod 424 and tubing 421 to facilitate sliding of slide out 400. Interior framing studs 432 for cabinets, beds and the like are connected to floor covering 428. Tubing 421 and studs 422 and 432 are pultruded resign impregnated fiberglass members having high shape retention and low expansion character whereby slide out 400 matches or fits evenly with the side wall of the trailer with close tolerances.

Figure 27:
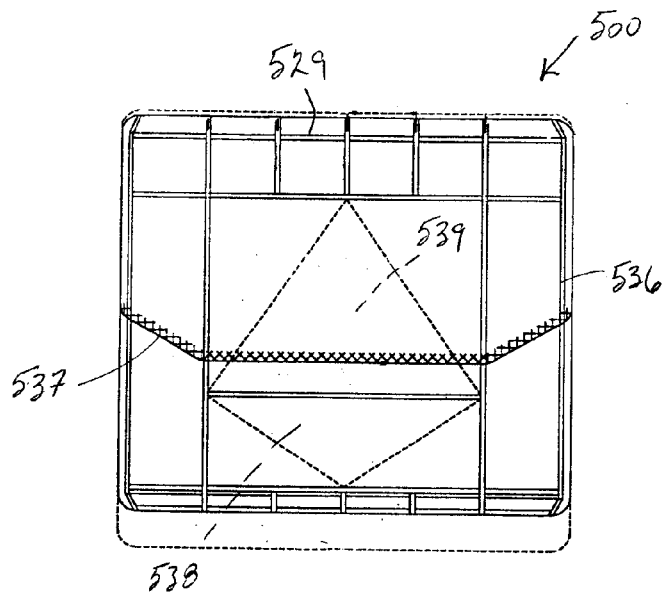
FIG. 27 is a rear elevational view of the frame structure of FIG. 20.

Referring to FIGS. 20 to 32, there is shown a fifth modification of the frame structure indicated generally at 500. Frame structure 500 is a framing assembly for a recreational vehicle, such as a travel trailer. Frame structure 500 is constructed with a plurality of lightweight, high strength members, such as pultruded resign impregnated fiberglass members. Frame structure 500 does not used hardware, such as bolts and screws, to join the members thereof. Other lightweight, high strength materials can be used in the construction of frame structure 500. The fiberglass members having high shape retention and low expansion characteristics to ensure the accuracy of the shape of frame structure 500. Frame structure 500 is moisture and fire resistant, and nonconductive and is compatible with insulation and wall covering materials. Frame structure 500 has a swing up rear door 539 and a swing down rear door 536 in the back wall 537 of the trailer, as seen in FIG. 27. Other custom features such as slide-out rooms, doors, windows, and interior framing for cabinets and beds can be incorporated into frame structure 500.

Figure 20:
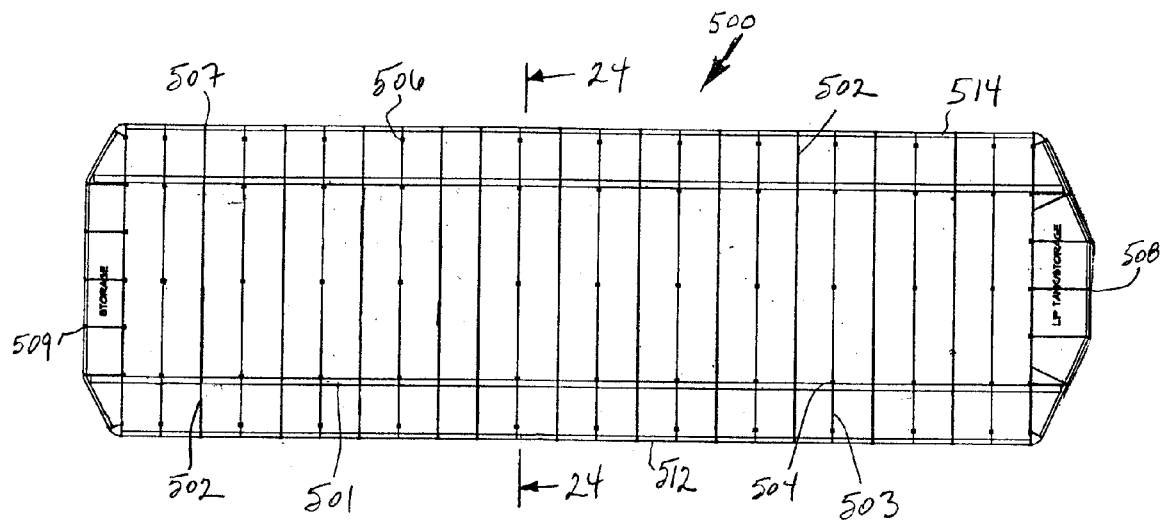
FIG. 20 is a top plan view of the floor framing of a fifth modification of the frame structure of FIG. 1.
Figure 21:
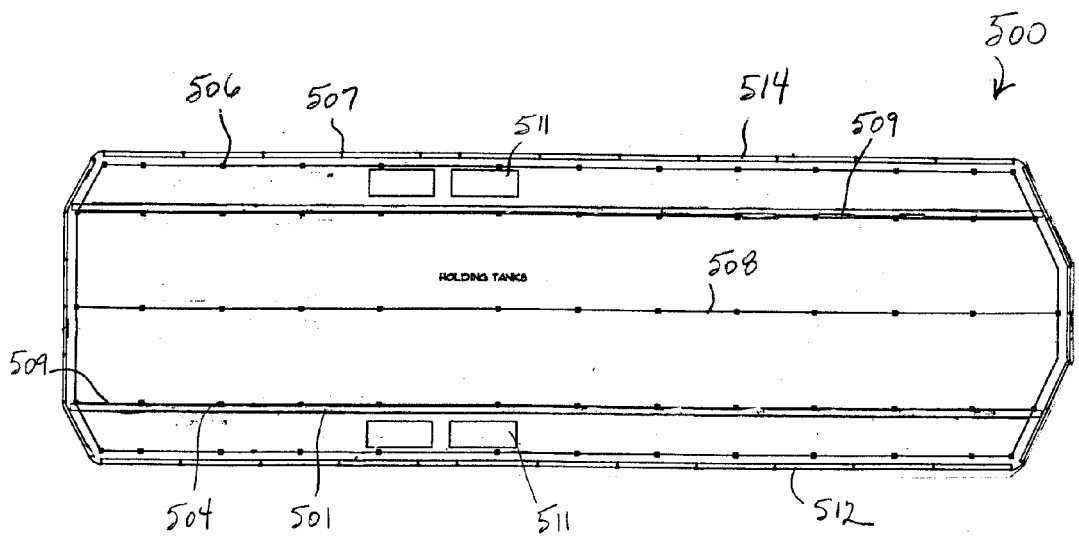
FIG. 21 is a top plan view of the under chassis framing of the frame structure of FIG. 20.
Figure 23:
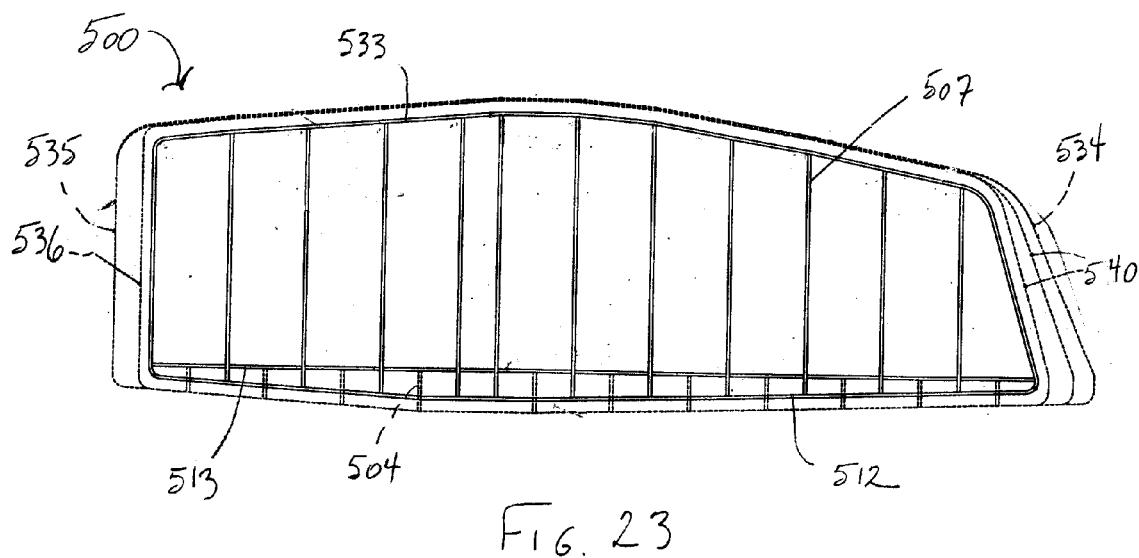
FIG. 23 is a side elevational view of the frame structure of FIG. 20.

As shown in FIGS. 20 and 21, frame structure 500 is attached to the chassis frame 501 of a travel trailer adjacent wheels 511. A plurality of laterally spaced floor joist tubing 502 and T-shaped joists or beams 503 extend transversely on top of chassis frame 501. Tubing 502 and T-shaped beams 503 alternate along the length of frame 501 at equal intervals, such as twelve-inch intervals. The ends of transverse floor tubing joists 503 have upright key shaped slots to accommodate T-shaped upright side wall studs 507. The ends of studs 507 are supported on curved wall plates 510, 512, 514 and 533 extending up the front, across the top, and down the rear, and along the bottom of frame structure 500 adjacent the sides of the trailer, as shown in FIG. 23. Plates 510, 512, 514 and 533 are T-shaped members having a first and second upright flanges joined with a transverse web. A plurality of laterally spaced cuts extending into each side of the flanges allow selected portions of wall plates 510, 512, 514 and 533 to curve.

Figure 30:
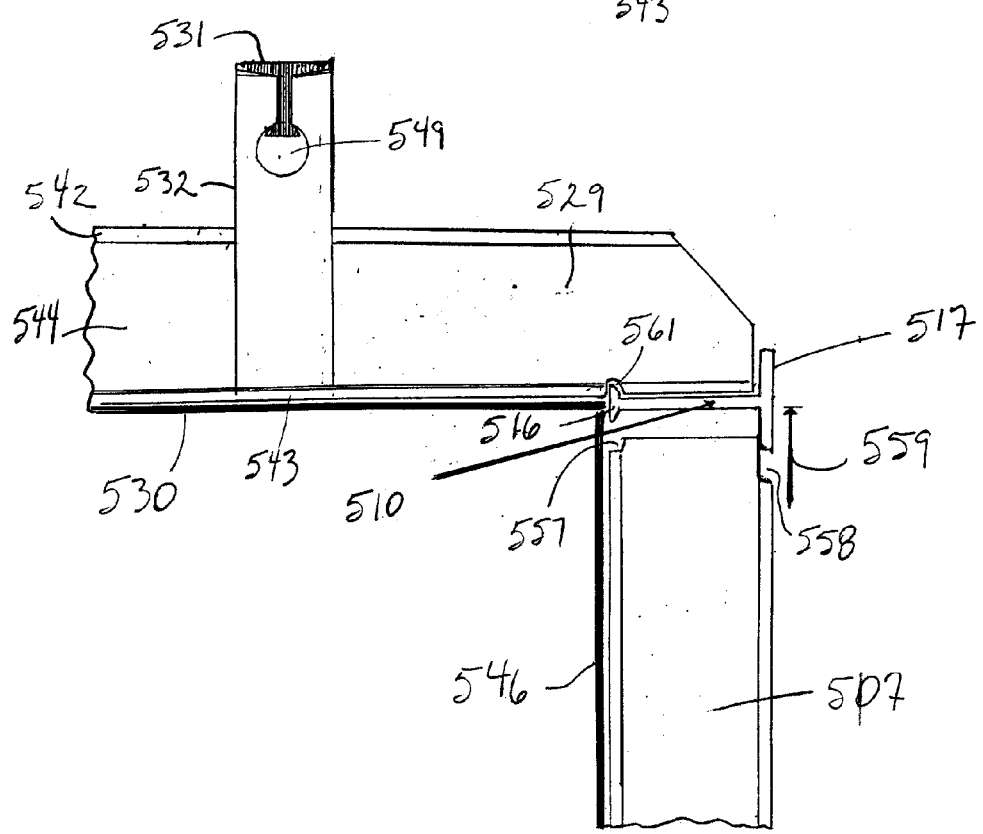
FIG. 30 is an enlarged side elevational view of the ceiling rafter and wall stud assembly of the frame structure of FIG. 20.

Referring to FIGS. 25, 26 and 30, the top end of wall stud 507 has notches 557 and 558 to accept flanges 516 and 517 of top wall plate 510. Similarly the bottom end of wall stud 507 is notched to accept the flanges of bottom wall plate 514. The end of ceiling rafter 529 has a notch 561 to accommodate the top end of flange 516. Ceiling rafter 529 is located in slot 551 of riser tubing 532. Slot 551 is a transverse keyhole shaped slot complementary to the shape of web 544 and top flange 542 of ceiling rafter 529 to lock rafter 529 to riser 532. The opposite end or upper end of ceiling riser 532 has a transverse keyhole shaped slot 549 perpendicular to slot 551 to accommodate roof rafter 531. Roof rafter 531 extends from front to back of framing structure 500 above, forwardly and rearwardly of ceiling rafter 529.

A plurality of drops or spacers 504 and 506 attached to transverse T-shaped floor beams 503 extend downwardly to longitudinal T-shaped under chassis support member 508 and 509. Each end of spacers 504 and 506 has a transverse keyhole shaped slot to accommodate beams 503 and longitudinal support members 508 and 509. The key slots of spacers 504 and 506 are perpendicular relative to each other to accommodate transversely extended beams 503 and longitudinally extended support members 508 and 509. Spacers 504 located adjacent the inside of chassis frame 501 are attached to support member 509 extending underneath frame 501. Spacers 504 have an opening open to frame 501 for fastening spacers 504 to frame 501 with a fastener, such as a carriage bolt. Spacers 504 and 506 define open interior areas in the lower portion of frame structure 500 between joists 502 and 503 and under chassis frame support members 508 and 509 into which plumbing, holding tanks, pumps, heaters, propane gas lines and the like can be located whereby the travel trailer has a low center of gravity. Valves for the holding tanks are located within the interior frame structure 500 to prevent freeze-up of the valves in cold weather conditions.

Figure 22:
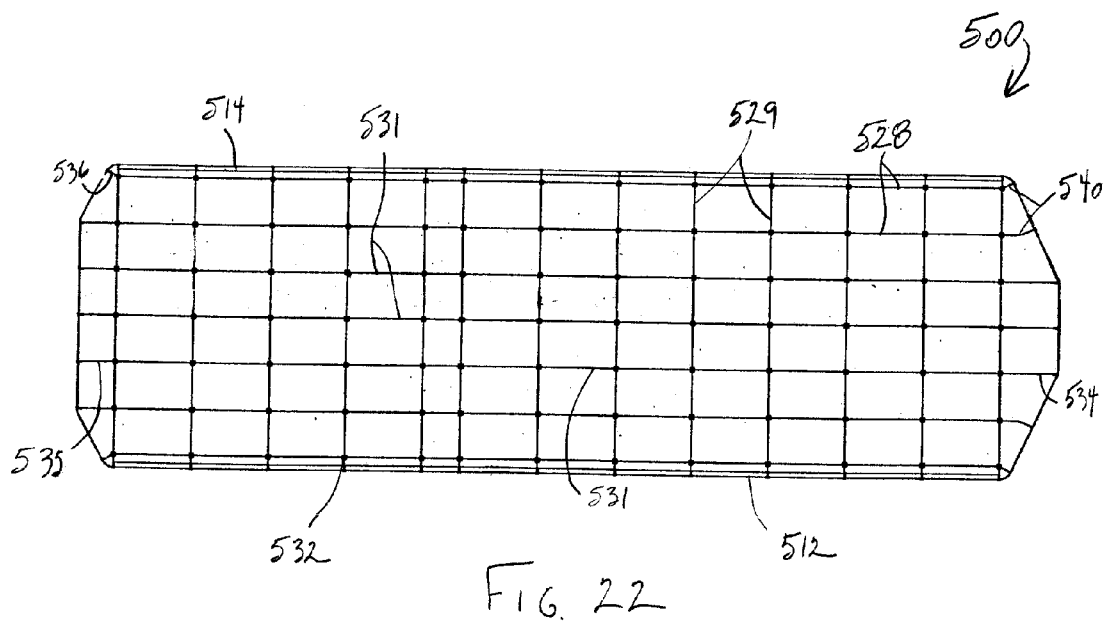
FIG. 22 is a top plan view of the roof framing of the frame structure of FIG. 20.
Figure 29:
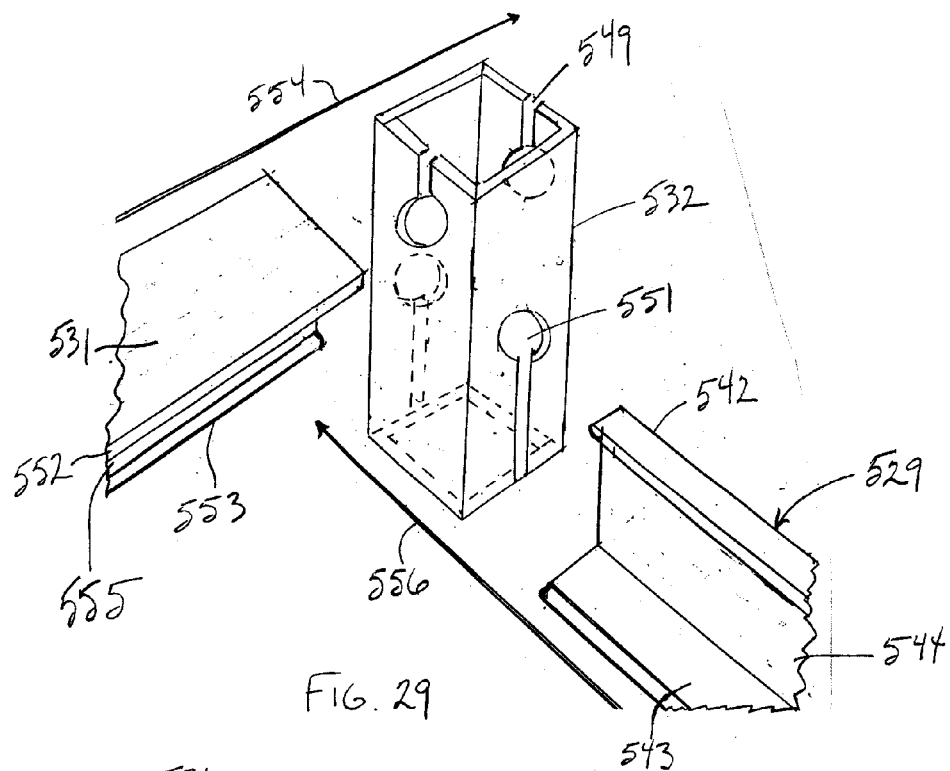
FIG. 29 is an enlarged exploded perspective view of the ceiling rafter and riser assembly shown in FIG. 28.

Referring to FIG. 22, the roof framing of frame structure 500 has a lattice construction having a plurality of transverse T-shaped ceiling rafters 529 connected to longitudinal roof rafters 531 with risers or spacers 532. Ceiling rafters 529 are transversely spaced T-shaped members having an upper end that extends into an upright keyhole shaped slot 551 in the bottom or riser 532. As seen in FIG. 29, ceiling rafters 529 having a relatively narrow top flange 542 joined to a wide bottom flange 543 with an upright web 544. Web 544 and flange 542 extend through upright keyhole slot 551 of riser 532. Flange 542 is wider than the width of slot 551 to prevent separation of rafter 529 and riser 532 thereby locking rafter 529 to riser 532. An adhesive, such as a two-part adhesive or a polyurethane adhesive, bonds riser 532 to ceiling rafter 529.

Returning to FIG. 21, the opposite end or the top end of ceiling risers 526 has an upright keyhole shaped slot 549 to accommodate longitudinally extending T-shaped roof rafters 531. The front ends 534 and rear ends 536 of roof rafters 531 curve downwardly toward the bottom of frame structure 500, as shown in FIG. 23.

Referring to FIG. 29, roof rafters 531 have a wide first or top flange 551 joined to a narrow second or bottom flange 553 with an upright web 552. Web 552 and flange 553 extend through upright slot 549 in the top of riser 532. Flange 553 is wider than slot 549 to prevent separation of roof rafter 531 from riser 532 thereby locking roof rafter 531 to riser 532. An adhesive is used to bond riser 532 to rafter 531. Risers 532 define open interior areas in upper, forward and rear portions of frame structure 500 between ceiling rafters 529 and wall studs 507 into which air conditioning and ducting, wiring, storage compartments and the like can be located.

Roof rafters 531 have a height which is less than the height of ceiling rafters 529. Preferably, roof rafters 531 are one-inch T-shaped members and ceiling rafters 529 are one and one-half inch T-shaped members. Slots 549 and 551 have lengths which are complementary to the heights of rafters 529 and 551 to lock rafters 529 and 531, and risers 532 together. Rafters 529 and 531, risers 532 and slots 549 and 551 can have other dimensions and orientations which are identical or dissimilar.

Referring to FIGS. 31 and 32, the front and back ends 534 and 535 of T-shaped roof rafters 531 have a series of laterally spaced transverse cuts or slits 562 to allow the ends 534 and 535 of roof rafters 531 to curve downwardly in the front and rear of frame structure 500. Slits 562 extend transversely through bottom flange 553 and web 555 adjacent top flange 552 to release the memory of the ends 534 and 535 of rafters 531. When the ends of rafter 531 are curved downwardly, the bottom ends of slits 562 are closed, as seen in FIG. 32. T-shaped roof rafters 528 have downwardly and outwardly curved front and rear ends 536 and 540. Ends 536 and 540 have angle cuts to rotate or turn rafter 528 outwardly, as seen in FIG. 22. Spacers 532 which meet angled roof rafter ends 536 and 540 have a key slot cut at an angle in the riser 532 to correspond to the angle of extension of ends 536 and 540. Adhesive, such as a two-part adhesive, is applied to curved ends 536 and 540 to hold the predetermined curvature of the ends.

The first step in the assembly of frame structure 500 is the roof lattice evolution. A plurality of keyhole slotted tubular risers 532 having perpendicular keyhole shaped slotted ends are mounted on a jig at predetermined laterally spaced positions. The end of a T-shaped ceiling rafter 529 is slid through lower slots 551 with wide flange 543 facing downwardly, as shown by arrow 556 in FIG. 29. An adhesive, such as a two-part adhesive or polyurethane adhesive, is used to secure the inner surface of flange 543 to the end of riser 532 and web 544 and narrow flange 542 to the walls of slot 551. A plurality of ceiling rafter/riser sub-assemblies are manufactured in a similar manner.

Figure 28:
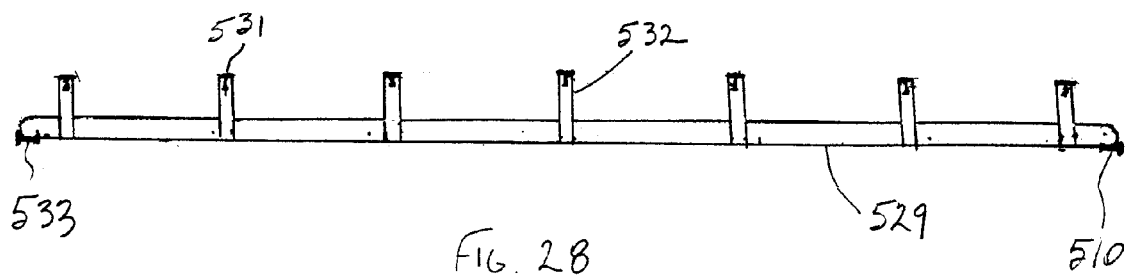
FIG. 28 is an enlarged side elevational view of the roof lattice assembly of the frame structure of FIG. 20.

Referring to FIGS. 22, 28 and 29, the ceiling rafters 529 are placed in a second jig for holding ceiling rafters 529 and risers 531 at equal transversely spaced positions with risers 532 extending upwardly. T-shaped roof rafters 528 and 531 are slid through aligned keyhole shaped slots 549 on the top ends of risers 532, as shown by arrow 554 in FIG. 29. Slots 549 are perpendicular to slots 551. Roof rafters 528 are inserted through the outer rows of slotted ends of risers 532 and rafters 531 are inserted through the middle rows of the slotted ends of risers 532. Wide flange 552 of roof rafter 528 and 531 are located adjacent the outer ends of risers 532. Roof rafters 528 and 531 are then bonded to risers 532 with an adhesive.

As shown in FIGS. 31 and 32, laterally spaced transverse cuts 562 are made through flange 553 and web 555 of the front ends 534 of roof rafters 531 to release the memory of rafters 531 so that the front ends 534 can be curved upwardly relative to the jig. Laterally spaced angle cuts are made through flange 553 and web 555 of the front ends 540 of roof rafter 528 to allow ends 540 to curve upwardly and outwardly relative to the jig. Similar transverse cuts are made to the rear ends 535 and 536 or rafters 528 to curve rear ends 535 upwardly and angular cuts are made to ends 536 to curve ends 536 upwardly and outwardly as desired. Additional spacers 532 are slid on and bonded to the ends of rafters 528 and 531 to define space within frame structure 500 for propane gas tanks and storage. Adhesive applied to roof rafters ends 534, 535, 536 and 540 maintains the curvature of the ends preventing the memory of the rafters to return the ends to a linear position.

Pre-cut customized insulation 548, such as polystyrene insulation, is fit into the openings between ceiling rafters 529 and risers 532 and glued. Ceiling panels 530 are glued to the inner surfaces of ceiling rafter flanges 543. Ceiling panels 530 are preferably a laminated plastic product commonly used for surface finishes. Other material compatible with the material of ceiling rafter 529 can be used to construct ceiling panels 530. Air bags distributing equal pressure on ceiling panels 530 can be used to clamp panels 530 until the adhesive dries. A cross brace can be used for temporary support of the roof lattice construction.

The left and right sidewall framing of frame structure 500 is initiated by notching the ends of T-shaped walls studs 507 to fit into wall plates 510, 512, 514 and 533. Heights of wall studs 507 vary to meet the design and shape of frame structure 500, as seen in FIG. 23. Interior framing for cabinets, bunks, etc., are slid onto wall studs 507 at ninety degree angles and glued. Interior framing such as one inch square tubing, has keyhole shaped slotted ends for attachment to wall studs 507. Wall studs 507 are also cut for openings, doors, windows and the like as desired.

Wall plates 510, 512, 514 and 533 are linear T-shaped members having upright flanges 516 and 517. A plurality of cuts are made into both edges of flanges 516 and 517 of wall plates 510, 512, 514 and 533 to allow the plates to curve laterally. Top wall plates 510 and 533 curve up the front, across the top and down the rear of the sidewall framing of frame structure 500. Bottom wall plates 512 and 514 curve across the bottom of frame structure 500 and align with top wall plates 510 and 533 to form a continuous oval shaped frame member, as seen in FIG. 23.

Top wall plate 510 is placed in a jig and notched top end of wall studs 507 are inserted into the bottom of wall plate 514, as shown by arrow 559 in FIG. 30, and glued. Top wall plate 533 and studs 507 are assembled in a similar manner. Pre-shaped insulation 548 is fit between the wall plates 510 and 533, and studs 507. Adhesive is used to hold the insulation in assembled position thereby minimizing movement of insulation 548 relative to the frame members resulting in noise reduction. Decorative sheeting material 546 is secured to wall studs 507 to cover the inner surfaces of the sidewall framing down to the floor level of the trailer.

Tubular floor joists 502 are placed in another jig for holding joists 502 at predetermined laterally spaced positions. The ends of joists 502 have upright keyhole shaped slots for accommodating T-shaped wall studs 507. The left and right sidewall framing structures are stood upright and merged with floor tubing joists 502. The lower ends of wall studs 507 are aligned with the key slots in joists 502. Studs 507 are slid through the key slots of joist tubing 502 until sheeting material 546 abuts the top of floor tubing 502 at the floor line of frame structure 500, as seen in FIG. 26. An adhesive is used to secure wall studs 507 to the ends of joists 502. A floor covering 547, such as one-half inch plywood, is glued to the top of joists 502. Bottom wall plats 512 and 514 are fit to the notched lower ends of wall studs 507 and secured to the ends of studs 507 with an adhesive. The ends of bottom wall plates 512 and 514 curve upwardly and abut the downwardly curved ends of top wall plates 510 and 533 to form a continuous wall plate frame structure of frame structure 500.

Another jig is employed in the assembly of the under chassis lattice evolution. A plurality of keyhole slotted tubular drops or spacers 504 and 506 are mounted on the jig at predetermined laterally spaced positions. Spacers 504 are positioned to be adjacent the chassis frame of a travel trailer. Each spacer 504 has a hole for a fastener to fasten frame structure 500 to the chassis frame. The end of a T-shaped floor joist 503 is slid through lower slots of spacers 504 and 506 with the wide flange facing downwardly. An adhesive, such as a two-part adhesive, is used to secure spacers 504 and 506 to T-shaped joists 503. A plurality of T-shaped floor joists/spacer sub-assemblies are manufactured in the same manner.

The floor joist/spacer sub-assemblies are held in a jig at predetermined laterally spaced positions which alternate with the laterally spaced positions of floor joist tubing 502, as seen in FIG. 20. Spacers 504 and 506 attached to T-shaped beams 503 extend upwardly. Longitudinal T-shaped under chassis support member 508 and 509 are inserted through the keyhole slots in ends of spacers 504 and 506 and bonded to the spacers. The key slots at the opposite ends of spacers 504 and 506 are perpendicular relative to each other to accommodate transversely extended beams 503 and longitudinally extended support members 508 and 509. Insulation 548 is fit between under chassis support members 508 and 509 and spacers 504 and 506 along the bottom of the trailer. A high performance under siding 541 is attached over insulation 548. Down spacers 504 have a hole for bolting the under chassis frame lattice to the chassis frame 501 of the trailer. Plumbing, holding tanks and valves, pumps, heaters, propane gas lines and the like are placed between T-shaped floor beams 503 and under chassis support members 508 and 509 and are supported on members 508 and 509 within the interior of frame structure 500.

To complete the construction of frame structure 500, the under chassis lattice is positioned under the sidewall/floor assembly whereby transverse floor tubing 502 and transverse floor T-shaped beams 503 alternate at predetermined equally spaced intervals, as seen in FIG. 20. Adhesive is applied to bottom of floor covering 547 and the tops of T-shaped floor joists 503 to bond under chassis lattice to the sidewall/floor assembly. The roof lattice is then place on top of the sidewall/floor assembly and bonded. Notches 561 in the ends of ceiling rafters 529 align with tops of flanges 516 of top wail plates 510 and 533 to prevent separation of wall plates 510 and 533 from ceiling rafter 529.

Figure 35:
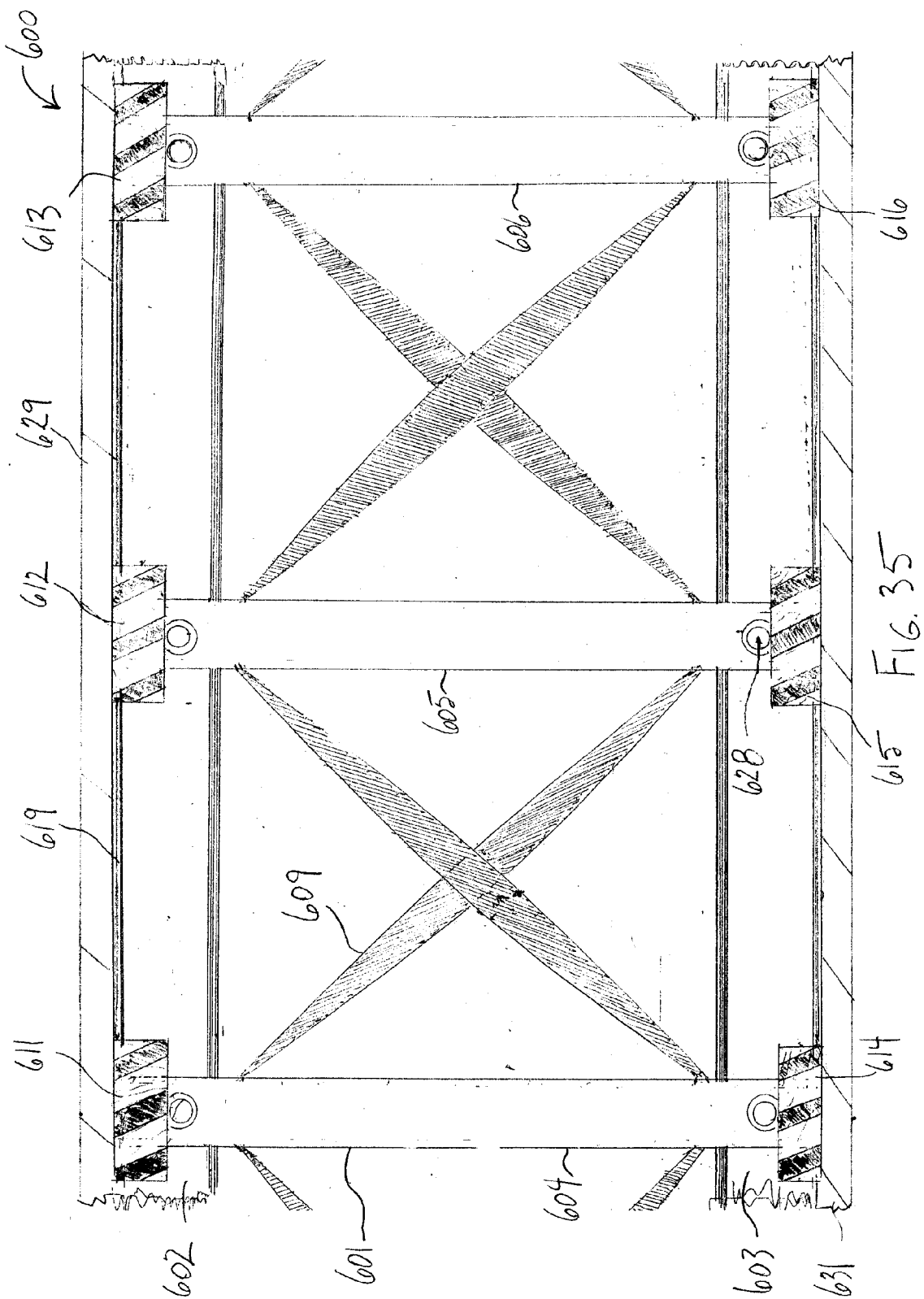
FIG. 35 is a sectional view taken along line 35—35 of FIG. 33.

Referring to FIGS. 33 to 35, there is shown a sixth modification of the frame structure indicated generally at 600. Frame structure 600 is a framing assembly for a modular home or frame house. Frame structure 600 is a lightweight, high strength framing assembly which is relatively inexpensive and easy anchored in cement. Frame structure 600 has a plurality of laterally spaced truss rafters 601 and 617. Truss rafters 601 and 617 are transversely spaced across frame structure 600 at equal intervals, such as sixteen inch intervals. The truss bottoms of frame structure 600 have substantially the same construction as truss rafters 601 and 617. Truss rafter 601 has a top T-shaped joist 602 joined to a bottom T-shaped joist 603 with a plurality of tubular risers 604, 605 and 606. The upper ends of risers 604 to 606 have upright key shaped slots 607 to accommodate top joist 602. The lower ends of risers 604 to 606 have key shaped slots 608 accommodating bottom joist 603. Slots 607 are generally parallel to slots 608 whereby top and bottom joists 602 and 603 extend parallel to each other. A semi-rigid generally flat band 609 extending through slots 607 and 608 cross braces truss rafter 601. Band 609 is threaded through slots 607 and 608 in a crisscross manner, as shown in FIG. 35. The intersecting portions of band 609 are rotated approximately 90 degrees whereby the flat surfaces of band 609 are in engagement in the middle of truss rafter 601. Sufficient tension is placed on band 609 whereby band 609 is tightly wound through slots 607 and 608. Band 609 is preferably a polypropylene strip of material having a textured outer surface. Other materials can be used to construct bands for cross bracing truss rafter 601.

A plurality of locking spacer rafters 611, 612, 613, 614, 615 and 616 extend between adjacent tubular joists of truss rafters 601 and 617. Spacer rafters 611 to 616 add stability to frame structure 600 and insure spacing between truss rafters 601 and 617. As seen in FIGS. 33 and 34, spacer rafter 611 is a rectangular shaped member having a length substantially the same as the interval length between truss rafters 601 and 617. Spacer rafter 611 can be made out of plywood or like construction material. The upper edge of end 618 of spacer rafter 611 is notched to accommodate the outer flange 619 of T-bar joist 602. The upper edge of the opposite end 621 of spacer rafter 611 is notched to accommodate flange 622 of T-bar joist 623. The lower surfaces of ends 618 and 621 are notched to accommodate the heads of pins 628. Groove 624 in end 618 accommodates tubular riser 605 of truss rafter 601. Groove 626 in end 621 of spacer rafter 613 accommodates tubular riser 627 of truss rafter 613. Supporting pins 628 extending into tubular risers 605 and 627 adjacent the bottom of spacer 611 provide support to spacer rafter 613. Ends 618 and 621 of spacer rafter 611 has a force fit with the flanges 619 and 622 of T-bar joists 602 and 623. Spacer rafters 612, 613, 614, 615 and 616 have substantially the same structure and function as spacer rafter 611. Roofing material 629, such as plywood, can be fastened to the outer surface of spacer rafters 611 to 613 and outer flanges 619 and 622 of joists 602 and 623. Ceiling material 631 can be secured to spacer rafters 614 to 616 and outer flanges 619 and 622 of joists 602 and 623. Adhesive 632 is used to secure the spacer rafters 611 to 616 and joists 602 and 623 to roofing material 629. Pins 628 hold the position of spacer rafters 611 to 616 until the adhesive sets. Adhesive 632 is also applied to adjacent surfaces of joists 602, 603 and 623, risers 604 to 606, 627 and 630, and bands 609 and 633 secures the joists, risers and bands of truss rafters 601 and 617 to form a lightweight, high strength frame structure. While the adhesive dries, the textured outer surface of bands 609 and 633 functions to grab the adhesive further tightening the band in slots 607, 608 and 634, 635. The adhesive can be applied with an airless glue gun. Other methods of adhesive application can be used to construct frame structure 600.

To complete the construction of frame structure 600, side wall framing structures, such as the side wall framing structures constructed in a manner of frame structure 500, are stood upright and merged with truss rafters 601 and 617 and truss bottoms.

The present disclosure are preferred embodiments of the connected frame structure and method of connecting frame members. It is understood that the connected frame structures are not to be limited to the specific materials, constructions and arrangements shown and described. It is understood that changes in parts, materials, arrangement and locations of structures may be made without departing from the invention.

What is claimed is:

1. A frame structure for a building construction comprising: a square linear tubing first frame member having a first end and a second end, the first end having a keyhole-shaped slot extending transversely therethrough, the slot having a generally linear outer opening and an inner opening spaced inwardly form the first end open to the outer opening, the inner opening having a width greater than the width of the outer opening, a T-shaped linear second frame member connected to the first frame member, the second frame member having a generally flat top flange and a bottom flange joined to opposite ends of a transverse web, the top flange located adjacent the first end, the bottom flange having a width less than the width of the top flange, the bottom flange and web located in the slot and extending through the second frame member, and adhesive means located between the first and second members for fastening the first and second members together to permanently fix the second frame member to the first end of the first frame member.

2. The frame structure of claim 1 wherein: the top flange of the second frame member has an inner surface sloping outwardly from the first end to longitudinally space the inner surface from the first end of the first frame member.

3. The frame structure of claim 1 wherein: the first and second frame members are pultruded resin impregnated fiberglass members.

4. The frame structure of claim 1 wherein: the first frame member is joined to a middle portion of the second frame member at about a 90 degree angle.

5. The frame structure of claim 1 wherein: the top and bottom flanges of the second frame member each have a width that is greater than a width of the outer opening of the slot of the first frame member.

6. The frame structure of claim 1 wherein: the the bottom flange has an inner surface having a shape complementary to the shape of the inner opening of the slot.

7. The frame structure of claim 1 wherein: the second end of the first frame member has a second keyhole-shaped slot perpendicular to the slot in the first end of the first frame member.

8. The frame structure of claim 1 wherein: the bottom flange of the second frame member has an intermediate portion having one or more grooves to allow the intermediate portion of the second frame member to be inserted into the slot in the first end of the first frame member.

9. A frame structure comprising: a first generally rectangular tubular frame member having a first end and a second end opposite from the first end, the first frame member having a slot extending through the first frame member, the slot having a first opening spaced inwardly a predetermined distance from the first end, the first opening having a top portion, the slot having a second opening in communication with the top portion of the first opening and the first end, a second generally linear frame member having a generally flat top flange joined to one end of a transverse web, the top flange located adjacent the first end of the first frame member, the second frame member having a bottom flange joined to an opposite end of the web, the bottom flange extending into the first opening and through the first frame member, the bottom flange having a inner surface located adjacent the top portion of the first opening of the first slot, the web extending into the second opening and through the first frame member, the web having a length approximately the same as the distance the first opening is spaced inwardly from the first end of the first frame member, and an adhesive located between the first frame member and the second frame member to secure the first and second frame members together.

10. The frame structure of claim 9 wherein: the top flange of the second frame has an inner surface sloping outwardly from the web to space the inner surface at a predetermined angle from the first end of the frame member whereby the adhesive is located between the inner surface of the top flange and the first end of the first frame member.

11. The frame structure of claim 9 wherein: the top flange has a width that is greater than the width of the bottom flange, the width of the bottom flange being greater than the width of the second opening.

12. The frame structure of claim 9 wherein: the second end has a second slot extending through the first frame member perpendicular to the first slot, the second slot having a first opening spaced inwardly from the second end and a second opening in communication with the first opening.

13. The frame structure of claim 9 wherein: the bottom flange has an intermediate portion having one or more grooves to allow the intermediate portion to be inserted into the first slot.

* * * * *